US006627280B1

(12) United States Patent
Suzuki et al.

(10) Patent No.: US 6,627,280 B1
(45) Date of Patent: Sep. 30, 2003

(54) COATED HOLLOW POLYESTER MOLDING, METHOD OF RECLAIMING THE SAME, AND SOLUTION FOR SURFACE COATING

(75) Inventors: Minoru Suzuki, Matsuyama (JP); Hiroki Nagano, Matsuyama (JP)

(73) Assignee: Teijin Limited, Osaka (JP)

( * ) Notice: Subject to any disclaimer, the term of this patent is extended or adjusted under 35 U.S.C. 154(b) by 122 days.

(21) Appl. No.: 09/869,609

(22) PCT Filed: Oct. 27, 2000

(86) PCT No.: PCT/JP00/07587

§ 371 (c)(1),
(2), (4) Date: Jul. 2, 2001

(87) PCT Pub. No.: WO01/32756

PCT Pub. Date: Oct. 5, 2001

(30) Foreign Application Priority Data

Nov. 2, 1999 (JP) ............................................. 11-312174
Nov. 2, 1999 (JP) ............................................. 11-312175

(51) Int. Cl.[7] .............................. B32B 1/02; B32B 1/08; B32B 27/08; B32B 27/36
(52) U.S. Cl. ..................... 428/35.7; 428/35.2; 428/36.9; 428/36.91; 428/480; 428/34.1; 528/293; 528/294; 528/295; 427/140; 427/154; 427/155; 427/299; 427/307; 427/322; 427/372.2; 427/384; 427/385.5; 427/393.5
(58) Field of Search ............................... 428/34.1, 35.2, 428/35.7, 36.9, 36.91, 480; 528/293, 294, 295, 140, 154, 155, 299, 307, 322, 372.2, 384, 385.5, 393.5

(56) References Cited

U.S. PATENT DOCUMENTS

| 4,482,586 A | * | 11/1984 | Smith et al. ................. 215/12.2 |
| 4,604,257 A | * | 8/1986 | Smith et al. ................. 264/513 |
| 4,643,925 A | * | 2/1987 | Smith et al. ................. 428/36.6 |
| 4,713,266 A | * | 12/1987 | Hasegawa et al. ........ 427/412.5 |
| 5,356,989 A | * | 10/1994 | Tachika et al. ............. 524/608 |
| 5,391,429 A | | 2/1995 | Otani et al. |

FOREIGN PATENT DOCUMENTS

| JP | 51-31879 | | 9/1976 |
| JP | 6-134950 | | 5/1994 |
| JP | 06240204 A | | 8/1994 |
| JP | 06-263902 | * | 9/1994 |
| JP | 6-263902 | | 9/1994 |
| JP | 06-134950 | * | 5/1995 |
| JP | 08-176284 | * | 7/1996 |
| JP | 8-176284 | | 7/1996 |
| JP | 8-225672 | | 9/1996 |
| JP | 10-110027 | * | 4/1998 |
| JP | 11-48429 | | 2/1999 |

* cited by examiner

Primary Examiner—Vivian Chen
(74) Attorney, Agent, or Firm—Sughrue Mion, PLLC

(57) ABSTRACT

To provide a polyester hollow molded product which eliminates the possibility of contaminating its contents, retains excellent transparency after it is used repeatedly by recycling and can be re-used with a substantially unscratched surface. The polyester hollow molded product has a polyester coating layer on the exterior surface and the coating layer can be removed with hot water or alkaline aqueous solution.

18 Claims, No Drawings

COATED HOLLOW POLYESTER MOLDING, METHOD OF RECLAIMING THE SAME, AND SOLUTION FOR SURFACE COATING

FIELD OF THE INVENTION

The present invention relates to a coated polyester hollow molded product, a regeneration method and a surface coating solution therefor. More specifically, it relates to a coated polyester hollow molded product having a coating film which can be easily removed without exerting a bad influence on the polyester hollow molded product, a regeneration method therefor and a surface coating solution for forming the coating film.

PRIOR ART

A polyethylene naphthalene dicarboxylate-based (may be abbreviated as PEN hereinafter) hollow molded product has more excellent characteristic properties than a polyethylene terephthalate-based (may be abbreviated as PET hereinafter) hollow molded product and is expected as a hollow molded product which can be salvaged and recycled.

The cleaning of a hollow molded product is necessary for recycling and generally carried out using an aqueous solution (1 to 6%) of sodium hydroxide heated at 50 to 1000° C.

However, when alkali cleaning is made on a PEN-based hollow molded product salvaged after use, the transparency of the hollow molded product reduces. The reduction of transparency is more marked as the number of times of salvaging and recycling increases.

Although water resistance can be provided simply by coating the surface of the PEN-based hollow molded product, it is difficult to remove the coating layer for recycling, for example, the coating layer can not be removed by cleaning with hot water.

When an ultraviolet light absorbing compound is blended with a material for the hollow molded product without forming a coating layer, such a problem as the contamination of contents by a bleed-out may arise.

Further, as the PEN-based hollow molded product has high surface hardness, its surface is easily scratched and the scratching of the surface must be suppressed for salvaging and recycling.

Meanwhile, the following publications are known for water-soluble polyesters.

JP-A 10-110027 (the term "JP-A" as used herein means an "unexamined published Japanese patent application") discloses a method of producing a hot water-soluble polyester by esterifying or carrying out an ester exchange reaction among terephthalic acid, alkali metal sulfonate group-containing aromatic dicarboxylic acid or lower alkyl ester thereof and ethylene glycol, and melt polycondensing and solid-phase polymerizing the esterified product or the product of the ester exchange reaction. The above publication teaches that the produced hot water-soluble polyester can be used as a material for forming a pattern by dissolving a required portion with hot water after the formation of a fabric.

JP-A 8-176284 discloses a water-soluble polyester which contains an ion dissociable group-containing dicarboxylic acid component and/or an ion dissociable group-containing glycol component in the molecular main chain of the polyester in an amount of 51 mol % or more based on the total of all the acid components, is produced at a polymerization temperature of 1800° C. or higher and lower than 2400° C. and has an intrinsic viscosity measured in orthochlorophenol at 350° C. of 0.25 or more. The above publication teaches that this water-soluble polyester is useful for the production of a low charged adherent polyester film which is useful for package materials, magnetic cards, magnetic tapes, magnetic disks, printing materials and the like.

SUMMARY OF THE INVENTION

It is an object of the present invention to provide a coated polyester hollow molded product which eliminates the possibility of contaminating its contents, retains excellent transparency even after it is salvaged and recycled and can be recycled with substantially no scratched surface.

It is another object of the present invention to provide a surface coating solution which is used for the production of the coated polyester hollow molded product of the present invention.

It is still another object of the present invention to provide a method of regenerating the coated polyester hollow molded product of the present invention for recycling.

Other objects and advantages of the present invention will become apparent from the following description.

According to the present invention, firstly, the above objects and advantages of the present invention are attained by a coated polyester hollow molded product comprising:

(A) a polyester hollow molded product, and
(B) a polyester coating layer formed on the exterior surface of the hollow molded product.

According to the present invention, secondly, the above objects and advantages of the present invention are attained by a surface coating solution for a polyester hollow molded product, which contains 1 to 40 wt % of a polyester comprising 92.99 to 60 mol % of at least one dicarboxylic acid unit selected from the group consisting of naphthalene dicarboxylic acid unit and terephthalic acid unit, 0.01 to 20 mol % of an isophthalic acid unit and 7 to 20 mol % of an isophthalic acid unit having a sulfonic acid metal salt group based on the total of all the dicarboxylic acid units as dicarboxylic acid components, and 65 to 95 mol % of an ethylene glycol unit and 35 to 5 mol % of a diethylene glycol unit based on the total of all the diol units as diol units, 0.1 to 10 wt % of a surfactant and a liquid medium.

According to the present invention, thirdly, the above objects and advantages of the present invention are attained by a method of regenerating a coated polyester hollow molded product comprising the steps of preparing the salvaged coated polyester hollow molded product of the present invention, removing a polyester coating layer for the hollow molded product and forming anew polyester coating layer on the surface of the hollow molded product from which the polyester coating layer has been removed.

The present invention will be described in detail hereinbelow.

A description is first given of the coated polyester hollow molded product of the present invention. The polyester hollow molded product (A) constituting the coated polyester hollow molded product comprises preferably an aromatic polyester, more preferably an aromatic polyester which comprises a recurring unit selected from the group consisting of ethylene-2,6-naphthalene dicarboxylate unit and ethylene terephthalate unit in an amount of at least 85 mol % based on the total of all the recurring units. The aromatic polyester may be used alone or blended with two or more types of another aromatic polyester.

Polyethylene terephthalate and polyethylene-2,6-naphthalene dicarboxylate are particularly preferred as the aromatic polyester.

The intrinsic viscosity of the aromatic polyester is preferably 0.5 to 1.0, more preferably 0.55 to 0.8, particularly preferably 0.55 to 0.75. When the intrinsic viscosity is lower than 0.5, blowing properties worsen, thereby making it difficult to obtain a molded product having a uniform thickness. When the intrinsic viscosity is higher than 1.0, elongation stress becomes high, which might be the cause of hazing a molded product.

The polyester hollow molded product made from the above polyester can be produced by employing a known general molding technique. Examples of the applicable molding method include biaxial orientation blow molding techniques (cold parison method and hot parison method), injection blow molding technique and direct blow molding technique. In addition, a molding technique in which a hollow molded product is formed after the polyester is molded into a sheet form may be used. The polyester hollow molded product may be a bottle.

Preferably, the polyester coating layer (B) formed on the exterior surface of the polyester hollow molded product has a weight reduction of 3 wt % or less when it is treated with 25° C. water for 2 hours and is removed when it is treated with an alkali aqueous solution having a temperature of 750° C. and a pH of 11.6 for 9 minutes.

When the weight reduction is 3 wt % or less after 2 hours of a treatment with 250° C. water, the polyester hollow molded product is circulated in the market and used as a vessel and the coating layer is substantially retained even after it contacts water during this. When the weight reduction is larger than 3 wt %. the coating layer substantially falls off or peels off from the hollow molded product, thereby causing an appearance problem. The weight reduction is more preferably 2 wt % or less.

The coating layer can be easily removed from the polyester hollow molded product circulated and used as a vessel under alkali conditions in the cleaning step when it is treated with an alkali aqueous solution having a temperature of 75° C. and a pH of 11.6 for 9 minutes. When the coating layer can be removed with an alkali aqueous solution under such conditions, the coating layer can be removed with hot water heated at 60 to 100° C., preferably 70 to 95° C. and a pH of 5.5 to 8.5, preferably 6 to 8 in most cases.

The preferred polyester coating layer (B) having the above properties is made from a polyester which comprises 92.99 to 60 mol % of at least one dicarboxylic acid unit selected from the group consisting of naphthalene dicarboxylic acid unit and terephthalic acid unit, 0.01 to 20 mol % of an isophthalic acid unit and 7 to 20 mol % of an isophthalic acid unit having a sulfonic acid metal salt group based on the total of all the dicarboxylic acid units as dicarboxylic acid components and 65 to 95 mol % of an ethylene glycol unit and 35 to 5 mol % of a diethylene glycol unit based on the total of all the diol units as diol units.

Examples of the naphthalene dicarboxylic acid unit include 2,6-naphthalene dicarboxylic acid and 2,7-naphthalene dicarboxylic acid, out of which 2,6-naphthalene dicarboxylic acid is particularly preferred.

The naphthalene dicarboxylic acid unit and the terephthalic acid unit maybe derived from an ester derivative. Examples of the ester derivative include methyl esters, ethyl esters, propyl esters and butyl esters, out of which methyl esters are preferred.

The amount of at least one unit selected from naphthalenedicarboxylid acid unit and terephthalic acid unit is 60 to 92.99 mol % based on the total of all the dicarboxylic acid components. When the amount is smaller than 60 mol %, the water resistance of the polyester lowers and when the amount is larger than 92.99 mol %, the solubility in hot water of the polyester deteriorates. Further from the viewpoint of solubility in hot water, the amount of the naphthalene dicarboxylic acid unit is preferably 50 mol % or less based on the total of all the dicarboxylic acid components.

The amount of the naphthalene dicarboxylic acid unit is preferably 0 to 50 mol %, more preferably 0 to 30 mol %, particularly preferably 0 to 10 mol % based on the total of all the dicarboxylic acid components to obtain excellent solubility in hot water.

Examples of the isophthalic acid unit include isophthalic acid and derivatives thereof such as methyl, ethyl, propyl and butyl esters.

The amount of the isophthalic acid unit is 0.01 to 20 mol %, preferably 0.01 to 15 mol %, particularly preferably 5 to 10 mol % based on the total of all the dicarboxylic acid components. When the amount is smaller than 0.01 mol %, the crystallinity of the polyester becomes too high. When the amount is larger than 20 mol %, reductions in polymerization reactivity and crystallinity become large.

Examples of the isophthalic acid unit having a sulfonic acid metal salt group include 5-lithium sulfoisophthalic acid, 5-sodium sulfoisophthalic acid and 5-potassium sulfoisophthalic acid, out of which 5-sodium sulfoisophthalic acid is particularly preferred.

They may be derived from a derivative. Examples of the derivative include esters such as methyl esters, ethyl esters, propyl esters and butyl esters, out of which methyl esters are particularly preferred.

The amount of the isophthalic acid unit having a sulfonic acid metal salt group is 7 to 20 mol %, preferably 8 to 15 mol %, particularly preferably 9 to 13 mol % based on the total of all the dicarboxylic acid components. When the amount is smaller than 7 mol %, solubility in hot water becomes insufficient and when the amount is larger than 20 mol %, reactivity at the time of polymerization deteriorates and melt viscosity becomes too high, thereby reducing productivity.

The amount of the ethylene glycol unit is 65 to 95 mol % based on the total of all the diol components.

The amount of the diethylene glycol unit is 5 to 35 mol %, preferably 10 to 35 mol %, particularly preferably 10 to 25 mol % based on the total of all the diol components. When the amount is smaller than 5 mol %, solubility in hot water lowers and when the amount is larger than 35 mol %, deterioration caused by thermal decomposition becomes large.

The diethylene glycol unit may be derived from a diethylene glycol component which is added at the time of polymerization or may be produced by a polymerization reaction.

The polyester of the polyester coating layer (B) is particularly preferably a polyester which comprises the isophthalic acid unit having a sulfonic acid metal salt group in an amount of 8 to 15 mol % based on the total of all the dicarboxylic acid units and the ethylene glycol unit in an amount of 75 to 95 mol % based on the total of all the diol units.

The polyester has an intrinsic viscosity of preferably 0.2 to 0.5, more preferably 0.25 to 0.45. When the intrinsic viscosity is lower than 0.2, chipping at the time of polymerization becomes difficult and strength becomes low disadvantageously. When the intrinsic viscosity is higher than 0.5, productivity at the time of polymerization lowers and solubility in hot water deteriorates disadvantageously.

The glass transition temperature of the polyester is preferably in the range of 55 to 90° C.

Out of the above polyesters for the polyester coating layer (B), a polyester having the following properties (1), (2) and (3) can increase the functionality of the polyester coating layer (B) because it eliminates the possibility of contaminating the contents of the hollow molded product and can retain excellent transparency and a substantially unscratched surface even when the hollow molded product is salvaged and recycled;
(1) a solubility in water heated at 95° C. of 10 wt % or more,
(2) a solubility in water heated at 30° C. of 1 wt % or less, and
(3) a reduction in intrinsic viscosity after 1 hour of a treatment with water heated at 95° C. of 0.01 at maximum.

The polyester can be produced by the following method. For example, it can be produced by esterifying or carrying out an ester exchange reaction among terephthalic acid or ester forming derivative thereof (preferably dimethyl ester), isophthalic acid or ester forming derivative thereof (preferably dimethyl ester), isophthalic acid having a sulfonic acid metal salt group or ester forming derivative thereof (preferably dimethyl ester), 2,6-naphthalene dicarboxylic acid or ester forming derivative thereof (preferably dimethyl ester) and ethylene glycol (diethilene glycol is added as the case may be) under heating.

In the case of the ester exchange reaction, a cobalt, manganese, calcium, magnesium and/or titanium compound may be used as a catalyst.

To control reactivity and the content of diethylene glycol, an alkali metal is preferably added. The alkali metal is preferably lithium, sodium or potassium. Out of these, sodium is preferred. The amount of the alkali metal is preferably 10 to 400 mmols, more preferably 100 to 250 mmols based on 100 mols of the total of all the dicarboxylic acid components.

Subsequently, a polycondensation reaction is carried out under heating and vacuum in the presence of a germanium, antimony and/or titanium catalyst(s) and a phosphorus compound.

The phosphorus compound is preferably an inorganic phosphoric acid such as phosphoric acid, hypophosphorous acid or phosphorous acid, or organic phosphoric acid such as trimethyl phosphate.

As desired, the polymer is then formed into a chip, pellet or block and ground before use.

The coating layer can be formed by applying a liquid coating solution containing this surface coating polyester to at least the exterior surface of the polyester hollow molded product and drying it.

A description is subsequently given of the surface coating solution.

The surface coating solution of the present invention contains the surface coating polyester in an amount of 1 to 40 wt %. When the amount is smaller than 1 wt %, film formation is difficult and when the amount is larger than 40 wt %, the viscosity of the solution becomes high, thereby making it difficult to handle the solution.

According to the present invention, there is provided a solution which contains 1 to 40 wt % of a specific polyester, 0.1 to 10 wt % of a surfactant and a liquid medium as a preferred surface coating solution as described above.

The surfactant may be ionic or nonionic. Preferably, it is polyethylene glycolorpolyoxyethylene sorbitan alkylate. These surfactants are preferably used in combination. That is, in a preferred aspect of the present invention, the surfactant is a mixture of polyethylene glycol and polyoxyethylene sorbitan alkylate in a weight ratio of preferably 10:1 to 1:5, more preferably 10:1 to 1:2 from the viewpoints of film forming properties at the time of coating and water resistance.

The surface coating solution of the present invention contains the surfactant in an amount of 0.1 to 10 wt %, preferably 0.1 to 5 wt %. When the surfactant is contained in the above range, wettability at the time of applying the coating solution for forming a coating layer becomes satisfactory and the removal of the formed coating layer with hot water or the removal of the coating layer with an alkali aqueous solution becomes easy. When the amount is larger than 10 wt %, solubility in normal temperature water increases.

The polyethylene glycol is preferably liquid with a low viscosity, particularly preferably liquid with a molecular weight of 200 to 1,000.

The polyoxyethylene sorbitan alkylate is preferably polyoxyethylene sorbitan oleate, polyoxyethylene sorbitan stearate or polyoxyethylene sorbitan palmitate, particularly preferably polyoxyethylene sorbitan oleate.

The surface coating solution is preferably a water solution or water dispersion prepared by dissolving or dispersing the above components in water. For dissolution or dispersion, hot water, preferably hot water heated at 60 to 100° C. is desirably used from the viewpoints of sanitation and handling safety.

In the case of a water solution, the surface coating polyester is dissolved in hot water, preferably hot water heated at 60 to 100° C., in preferably 20 hours or less, more preferably 10 hours or less, particularly preferably 3 hours or less. This is aimed to suppress hydrolysis. The amount of the surface coating polyester is preferably 1 to 40 wt %, more preferably 5 to 20 wt %. The amount is suitably controlled to this range by a coating method or the thickness of a coating film. When the amount of the surface coating polyester is smaller than 1 wt %, the thickness of the coating film is small and nonuniform disadvantageously. When the amount is larger than 40 wt %, the amount of the residual polyester undissolved in hot water increases, the viscosity of the solution rises, and coatability deteriorates disadvantageously.

As a dispersing means, the surface coating polyester is dissolved in an organic solvent such as ethanol, methanol, isopropyl alcohol, chloroform, acetone, methyl ethyl ketone or ethyl acetate in a high concentration and mixed with water.

In either one of the cases of a water solution and a water dispersion, the surfactant may be contained in the surface coating solution and may be added in any stage.

The surface coating solution of the present invention preferably has a haze value at 25° C. of 30% or less, a pH of more than 5 and less than 7, a viscosity of 0.5 Pa-s or less and an electric conductivity of 100 to 4,000 $\mu$S/cm.

The surface coating solution of the present invention may contain at least one agent selected from the group consisting of an ultraviolet light absorbent and colorant.

The surface coating solution of the present invention is novel as a solution for coating the surface of a polyester hollow molded product.

Therefore, according to the present invention, there is further provided use of the surface coating solution of the present invention which comprises 1 to 40 wt % of the above specific polyester, 0.1 to 10 wt % of a surfactant and a liquid medium for coating a polyester hollow molded product.

The coating layer formed by using the surface coating solution of the present invention provides the effects of preventing the exterior surface of a hollow molded product from being scratched, burying a small scratch and preventing the appearance from being marred. Further, it has the ability of absorbing ultraviolet radiation and provides the effect of suppressing the deterioration of the polyethylene naphthalene dicarboxylate of the polyester hollow molded product by ultraviolet radiation when it is used, salvaged and kept.

The haze value of the barrel portion of the polyester hollow molded product having this coating layer of the present invention is preferably 5% or less, more preferably 2% or less at a thickness of 300 μm. When the haze value is larger than 5%, transparency is low and the appearance as one of the values of a commercial product is marred if the polyester hollow molded product is used as a bottle to be filled with a drink.

The thickness of the coating layer is preferably 0.1 to 10 μm, more preferably 0.1 to 5 μm, much more preferably 0.2 to 2 μm. When the thickness is smaller than 0.1 μm, an optical deterioration suppression effect obtained by coating the surface of the hollow molded product is low disadvantageously. When the thickness is larger than 10 μm, the removal of the coating layer with hot water or an alkaline aqueous solution takes long disadvantageously.

The coating layer may include in an amount of 5 to 50 parts by weight based on 100 parts by weight of the polyester, derived from the surfactant contained in the coating solution.

In the present invention, this coating layer is renewed by removal and regeneration each time the polyester hollow molded product is re-used.

Therefore, according to the present invention, as described above, there is provided a method of regenerating a coated polyester hollow molded product comprising the steps of preparing the salvaged coated polyester hollow molded product of the present invention, removing a polyester coating layer from the hollow molded product, and forming a new polyester coating layer on the surface of the hollow molded product from which the polyester coating layer has been removed.

The step of removing the coating layer is preferably a step including cleaning with heated water or alkaline aqueous solution and cleaning with water thereafter.

For cleaning with heated water or alkaline aqueous solution, the temperature of the water or alkaline aqueous solution used for removing the coating layer is preferably 60 to 100° C., more preferably 65 to 95° C. When the temperature is lower than 600° C., satisfactory cleaning cannot be carried out, the coating layer cannot be completely removed and a further a sterilizing effect cannot be expected disadvantageously. When the temperature is higher than 100° C., the thermal deformation of the polyester hollow molded product is caused disadvantageously. When the alkaline aqueous solution is used, sodium hydroxide is preferably used in a concentration of 1 to 6%.

For cleaning with heated water or alkaline aqueous solution, the polyester hollow molded product is preferably immersed in the above heated water or alkaline aqueous solution. As the case may be, the heated water or aqueous solution may be sprayed onto the polyester hollow molded product.

For cleaning with water after cleaning with heated water or alkaline aqueous solution, water heated at 95° C. or less is preferably used. This cleaning may be carried out to such an extent that the alkaline aqueous solution is washed away completely.

In the present invention, the coating layer is renewed by forming a new coating layer on the polyester hollow molded product from which the coating layer has been removed so as to regenerate the polyester hollow molded product. The method of forming this coating layer may be the method of forming a coating layer when a polyester hollow molded product is to be produced. To this end, the surface coating solution of the present invention is preferably used.

The renewal of the coating layer is preferably carried out each time the polyester hollow molded product is re-used. That is, each time it is re-used, it is preferably used to apply such a method that the polyester hollow molded product is regenerated by the above regeneration method.

The polyester hollow molded product can be used repeatedly by renewing the coating layer by this regeneration method and the haze of a barrel portion having a thickness of 300 μm when the polyester hollow molded product is used 20 times repeatedly can be adjusted to 5% or less, preferably 2% or less. When it is used repeatedly, the polyester hollow molded product is exposed to the ultraviolet radiation of the sunlight and the exposed dose of ultraviolet radiation having a wavelength range of 310 to 400 nm is estimated at 7,500 mJ/cm² to 90,000 mJ/cm² for one time of use.

EXAMPLES

The following examples are given to further illustrate the present invention. The characteristic properties were measured by the following methods.

(1) Solubility

The time required for the dissolution of the surface coating polyester for the preparation of the surface coating solution was measured.

(2) Coatability

The surface coating solution was applied to a PEN film and wettability at this point was evaluated. Further, after coating, the coating solution was dried naturally to form a coating layer and the surface state of the coating layer was evaluated.

(3) Stability

The surface coating solution was dried by an evaporator to obtain solid matter and its intrinsic viscosity was measured and taken as the initial intrinsic viscosity. The surface coating solution of Reference Example 1 was maintained at 100° C. for 2 hours and dried by an evaporator to obtain solid matter and its intrinsic viscosity was measured and taken as the final intrinsic viscosity.

The following equation was used to calculate the stability of the surface coating solution.

stability (%)=100 (%)×(initial intrinsic viscosity−final intrinsic viscosity)/(initial intrinsic viscosity)

(4) Intrinsic Viscosity 180 mg of a sample was dissolved in a mixed solvent of phenol and tetrachloroethane (3:2) and its intrinsic viscosity was measured by an Ubbellohde viscometer tube at 250° C. The Huggins' constant of polyethylene terephthalate was used.

(5) Preparation of Test Sample

A 4 cm×4 cm test sample was cut out from the barrel portion of a bottle (thickness of about 300 μm). When the test sample had a surface coating layer, the test sample was cut out together with the surface coating layer.

(6) Exposure to Ultraviolet Radiation

The test sample was exposed to ultraviolet radiation using a xenon tester (XW-150 Shimadzu xenon tester) for 4 hours.

(7) Exposed Dose of Ultraviolet Radiation

The ultraviolet radiation (250 to 310 nm, 310 to 400 nm) exposed dose of the test sample was measured by the UM-10 ultraviolet intensitometer of MINORUTA Co., Ltd. (UM-250 photodetector, 360).

(8) Cleaning

The test sample was cleaned by immersing in a 1.8% NaOH aqueous solution (pH of 11.6) at 75° C. for 9 minutes, further cleaned with water and dried.

(9) Haze

The test sample was set in a turbidimeter (MODEL 1001DP color and color difference meter of Nippon Denshoku Kogyo Co., Ltd.) to measure its haze.

Example 1

Preparation of Surface Coating Polyester and Surface Coating Solution)

An ester exchange reaction among 100 parts by weight of dimethyl terephthalate (may be abbreviated as DMT hereinafter), 19 parts by weight of dimethyl 5-sodium sulfoisophthalic (may be abbreviated as K2 hereinafter), 12.5 parts by weight of dimethyl isophthalate (may be abbreviated as DMI hereinafter) and 72 parts by weight of ethylene glycol (may be abbreviated as EG hereinafter) was carried out in the presence of manganese acetate and sodium acetate as catalysts while by-produced methanol was distilled off to the outside of a system and the temperature was raised to 250° C., antimony trioxide was added as a polymerization catalyst when the distillation of methanol was almost completed, and trimethyl phosphate was then added as a stabilizer to terminate the ester exchange reaction. Thereafter, the reaction product was polycondensed under high temperature and high vacuum to obtain a polymer having an intrinsic viscosity of 0.40 (mixed solvent of 2 parts by weight of tetrachloroethane and 3 parts by weight of phenol, 25° C.). This polymer was formed into strand-like chips as surface coating polyester A.

This surface coating polyester A was dissolved in 95° C. hot water to a concentration of 10 wt %, 2 wt % of polyethylene glycol having a molecular weight of 200 and 0.5 wt % of polyoxyethylene sorbitan oleate were added to the obtained solution to prepare a surface coating solution under conditions shown in Table 1. This surface coating solution was evaluated. The results are shown in Table 1 and Table 2. The coating layer formed by using this surface coating solution did not dissolve in 35° C. hot water and did not peel off.

TABLE 1

| | DMT (mol %) | DMI (mol %) | K2 (mol %) | NDC* (mol %) | sodium acetate (mol %) | intrinsic viscosity | content of DEG* (mol %) | temperature of hot water (° C.) | dissolution time (min) | stability (%) |
|---|---|---|---|---|---|---|---|---|---|---|
| Ex. 1  | 80 | 10 | 10 | 0  | 200 | 0.40 | 11 | 95  | 20 | 15 |
| Ex. 2  | 80 | 10 | 10 | 0  | 100 | 0.30 | 19 | 95  | 30 | 20 |
| Ex. 3  | 79 | 10 | 11 | 0  | 0   | 0.22 | 25 | 75  | 60 | 15 |
| Ex. 4  | 90 | 0  | 10 | 0  | 150 | 0.40 | 10 | 90  | 40 | 15 |
| Ex. 5  | 80 | 5  | 15 | 0  | 200 | 0.44 | 18 | 80  | 60 | 25 |
| Ex. 6  | 77 | 15 | 8  | 0  | 150 | 0.38 | 11 | 95  | 45 | 8  |
| Ex. 7  | 80 | 0  | 10 | 10 | 150 | 0.21 | 12 | 95  | 50 | 10 |
| Ex. 8  | 75 | 10 | 15 | 10 | 200 | 0.44 | 18 | 85  | 60 | 18 |
| Ex. 9  | 70 | 10 | 10 | 10 | 200 | 0.39 | 14 | 95  | 50 | 10 |
| Ex. 10 | 45 | 15 | 10 | 30 | 100 | 0.25 | 22 | 95  | 50 | 10 |
| Ex. 11 | 45 | 10 | 15 | 30 | 150 | 0.32 | 15 | 95  | 40 | 10 |
| Ex. 12 | 25 | 13 | 12 | 50 | 100 | 0.31 | 25 | 100 | 60 | 10 |

Ex.: Example
*NDC: naphthalene-2,6-dicarboxylate
*DEG: diethylene glycol

Examples 2 to 12

A surface coating polyester having composition shown in Table 1 was obtained in the same manner as in Example 1 to prepare a surface coating solution under conditions shown in Table 1 and Table 2. This surface coating solution was evaluated. The results are shown in Table 1 and Table 2.

In any example, the coating layer formed by using the surface coating solution did not dissolve in 35° C. hot water and did not peel off.

TABLE 2

| | surfactant | | wettability | surface state |
|---|---|---|---|---|
| Ex. 1 | 2 wt % of polyethylene glycol (molecular weight of 200) | 0.5 wt % of polyoxyethylene sorbitan oleate | ◯ | ◯ |
| Ex. 2 | 2 wt % of polyethylene glycol (molecular weight of 300) | 1 wt % of polyoxyethylene sorbitan oleate | ◯ | ◯ |
| Ex. 3 | 2 wt % of polyethylene glycol (molecular weight of 300) | — | ◯ | ◯ |
| Ex. 4 | — | 1 wt % of polyoxyethylene sorbitan oleate | ◯ | ◯ |
| Ex. 5 | 2 wt % of polyethylene glycol (molecular weight of 200) | 0.5 wt % of polyoxyethylene sorbitan oleate | ◯ | ◯ |
| Ex. 6 | 2 wt % of polyethylene glycol (molecular weight of 200) | 0.5 wt % of polyoxyethylene sorbitan oleate | ◯ | ◯ |

TABLE 2-continued

| | surfactant | | wettability | surface state |
|---|---|---|---|---|
| Ex. 7 | 2 wt % of polyethylene glycol (molecular weight of 200) | 0.5 wt % of polyoxyethylene sorbitan oleate | ○ | ○ |
| Ex. 8 | 2 wt % of polyethylene glycol (molecular weight of 200) | 0.5 wt % of polyoxyethylene sorbitan oleate | ○ | ○ |
| Ex. 9 | 2 wt % of polyethylene glycol (molecular weight of 200) | 0.5 wt % of polyoxyethylene sorbitan oleate | ○ | ○ |
| Ex. 10 | 2 wt % of polyethylene glycol (molecular weight of 200) | 0.5 wt % of polyoxyethylene sorbitan oleate | ○ | ○ |
| Ex. 11 | 2 wt % of polyethylene glycol (molecular weight of 200) | 0.5 wt % of polyoxyethylene sorbitan oleate | ○ | ○ |
| Ex. 12 | 2 wt % of polyethylene glycol (molecular weight of 200) | 0.5 wt % of polyoxyethylene sorbitan oleate | ○ | ○ |

Ex.: Example
wettability: ○ means that surface cissing is rare and uniform coating is possible.
surface state: ○ means that the dried surface is uniformly coated.

Reference Examples 1 to 5

Production of Polyesters

Polyesters for the polyester hollow molded product were produced by the methods of the following Reference Examples 1 to 5.

Reference Example 1

An ester exchange reaction between 100 parts by weight of 2,6-naphthalene dicarboxylic acid dimethyl ester and 70 parts by weight of ethylene glycol was carried out in the presence of cobalt acetate, calcium acetate and magnesium acetate as ester exchange catalysts while the by-produced methanol was distilled off to the outside of a system and the temperature was increased to 250° C., germanium acetate was added as a polymerization catalyst when the distillation of methanol was almost completed and trimethyl phosphate was then added as a stabilizer to terminate the ester exchange reaction. Thereafter, the reaction product was polycondensed under high temperature and high vacuum to obtain a prepolymer having an intrinsic viscosity of 0.50 (mixed solvent of 2 parts by weight of tetrachloroethane and 3 parts by weight of phenol, 25° C.). This prepolymer was formed into strand-like chips and solid-phase polymerized under heating and vacuum to obtain a thermoplastic polyester which was a solid-phase polymerization polymer having an intrinsic viscosity of 0.65 (mixed solvent of 2 parts by weight of trichlorophenol and 3 parts by weight of phenol, 35° C.).

Reference Example 2

An ester exchange reaction among 93 parts by weight of 2,6-naphthalene dicarboxylic acid dimethyl ester, 5.4 parts by weight of dimethyl terephthalate and 70 parts by weight of ethylene glycol was carried out in the presence of cobalt acetate and manganese acetate as ester exchange catalysts while the by-produced methanol was distilled off to the outside of a system and the temperature was increased to 250° C., antimony trioxide was added as a polymerization catalyst when the distillation of methanol was almost completed and phosphoric acid was then added as a stabilizer to terminate the ester exchange reaction. Thereafter, the reaction product was polycondensed under high temperature and high vacuum to obtain a prepolymer having an intrinsic viscosity of 0.50 (mixed solvent of 2 parts by weight of tetrachloroethane and 3 parts by weight of phenol, 25° C.). This prepolymer was formed into strand-like chips and solid-phase polymerized under heating and vacuum to obtain a thermoplastic polyester which was a solid-phase polymerization polymer having an intrinsic viscosity of 0.70 (mixed solvent of 2 parts by weight of trichlorophenol and 3 parts by weight of phenol, 35° C.).

Reference Example 3

An ester exchange reaction among 10 parts by weight of 2,6-naphthalene dicarboxylic acid dimethyl ester, 71.7 parts by weight of dimethyl terephthalate and 70 parts by weight of ethylene glycol was carried out in the presence of cobalt acetate and manganese acetate as ester exchange catalysts while the by-produced methanol was distilled of f to the outside of a system and the temperature was increased to 250° C., antimony trioxide was added as a polymerization catalyst when the distillation of methanol was almost completed and phosphoric acid was then added as a stabilizer to terminate the ester exchange reaction. Thereafter, the reaction product was polycondensed under high temperature and high vacuum to obtain a prepolymer having an intrinsic viscosity of 0.57 (mixed solvent of 2 parts by weight of tetrachloroethane and 3 parts by weight of phenol, 25° C. ). This prepolymer was formed into strand-like chips and solid-phase polymerized under heating and vacuum to obtain a thermoplastic polyester which was a solid-phase polymerization polymer having an intrinsic viscosity of 0.83 (mixed solvent of 2 parts by weight of tetrachloroethane and 3 parts by weight of phenol, 25° C.).

Reference Examples 4 and 5

An ester exchange reaction among 88 parts by weight of 2,6-naphthalene dicarboxylic acid dimethyl ester, 9.6 parts by weight of dimethyl terephthalate and 70 parts by weight of ethylene glycol was carried out in the presence of cobalt acetate and magnesium acetate as ester exchange catalysts while the by-produced methanol was distilled off to the outside of a system and the temperature was increased to 250° C., antimony trioxide was added as a polymerization catalyst when the distillation of methanol was almost completed and trimethyl phosphate was then added as a stabilizer to terminate the ester exchange reaction. Thereafter, the reaction product was polycondensed under high temperature and high vacuum to obtain a prepolymer having an intrinsic viscosity of 0.44 (mixed solvent of 2 parts by weight of tetrachloroethane and 3 parts by weight of phenol, 25° C.). This prepolymer was formed into strand-like chips and solid-phase polymerized under heating and vacuum to obtain a polymer (to be blended) having an intrinsic viscosity of 0.45 (mixed solvent of 2 parts by weight of trichlorophenol and 3 parts by weight of phenol, 35° C.).

The polymer (to be blended) and PET (TR8580 of Teijin Limited (IV=0.83)) were melt kneaded together in the following ratio to obtain a thermoplastic polyester which was a blend polymer.

polymer (Reference Example 4); polymer (to be blended)/PET=30/70 (parts by weight)

polymer (Reference Example 5); polymer (to be blended)/PET=50/50 (parts by weight)

Examples 13 and 14

Production of Surface Coating Polyesters

Surface coating polyesters B and C were produced by the methods of Examples 13 and 14 below.

Example 15

Surface Coating Polyester B

An ester exchange reaction among 87.5 parts by weight of dimethyl terephthalate, 19 parts by weight of dimethyl 5-sodium sulfoisophthalic, 12.5 parts by weight of dimethyl isophthalate, 72 parts by weight of ethylene glycol and 15.7 parts by weight of 2,6-naphthalene dimethyl carboxylate was carried out in the presence of manganese acetate and sodium acetate while the by-produced methanol was distilled off to the outside of a system and the temperature was increased to 250° C., antimony trioxide was added as a polymerization catalyst when the distillation of methanol was almost completed and trimethyl phosphate was then added as a stabilizer to terminate the ester exchange reaction. Thereafter, the obtained reaction product was polycondensed under high temperature and high vacuum to obtain a polymer having an intrinsic viscosity of 0.35 (mixed solvent of 2 parts by weight of tetrachloroethane and 3 parts by weight of phenol, 25° C.). This polymer was formed into strand-like chips to obtain surface coating polyester B.

Example 16

Surface Coating Polyester C

An ester exchange reaction among 46 parts by weight of dimethyl terephthalate, 25 parts by weight of dimethyl 5-sodium sulfoisophthalate, 19 parts by weight of dimethyl isophthalate, 72 parts by weight of ethylene glycol and 55 parts by weight of 2,6-naphthalene dimethyl carboxylate was carried out in the presence of manganese acetate and sodium acetate while the by-produced methanol was distilled off to the outside of a system and the temperature was increased to 250° C., antimony trioxide was added as a polymerization catalyst when the distillation of methanol was almost completed and trimethyl phosphate was then added as a stabilizer to terminate the ester exchange reaction. Thereafter, the obtained reaction product was polycondensed under high temperature and high vacuum to obtain a polymer having an intrinsic viscosity of 0.30 (mixed solvent of 2 parts by weight of tetrachloroethane and 3 parts by weight of phenol, 25° C.). This polymer was formed into strand-like chips to obtain surface coating polyester C.

Examples 17 to 24

A preform for a hollow molded product was injection molded from the polyester of Reference Example 1, heated and formed into a bottle by orientation blow molding. The preform was molded by the M100DM molding machine of Meiki Co., Ltd. (cylinder temperature of 290° C., screw revolution of 160 rpm, molding cycle of 30 sec). The preform had an average barrel thickness of 4.2 mm and a weight of about 55 g. The bottle was molded by the LB01 of KRUPP CORPOPLAST Co., Ltd. and had an inner capacity of about 1.5 liters, an average barrel thickness of about 300 $\mu$m and a haze of 0.7%.

Coating solutions 1 to 8 having compositions shown in Table 3 were prepared. Any one of the coating solutions 1 to 8 was applied to the exterior surface of the above bottle and dried with air to form a surface coating layer as thick as about 1 $\mu$m to produce a bottle having the surface coating layer. The above test sample was cut out from this bottle.

The test sample was exposed to ultraviolet radiation by the above method and cleaned by the above method to remove the surface coating layer. The operation cycle of forming a surface coating layer again on the test sample in this state in the same manner as the first surface coating layer, exposing to ultraviolet radiation and cleaning was repeated a total of 20 times.

After the above operation cycle was repeated 20 times, the haze of the test sample after surface coating and the haze of the test sample after cleaning were measured. The results are shown in Table 4.

At the time of first exposure to ultraviolet radiation, the exposed dose of ultraviolet radiation for one time of exposure was measured. The results are shown in Table 4.

The surface coating layer of the bottle having the first surface coating layer and the surface coating layer of the test sample could not be removed with water (pH of 6.5) heated at 25° C. (35° C. or less) but could be removed completely by the above cleaning.

Examples 25 to 28

Bottles were produced from the polyesters of Reference Examples 2 to 5 in the same manner as in Example 1, a surface coating layer was formed on each of the bottles, and the resulting bottles having a surface coating layer were evaluated in the same manner as in Example 1. The results are shown in Tables 3 and 4.

The surface coating layer of the bottle having the first surface coating layer and the surface coating layer of the test sample could not be removed with water (pH of 6.3) heated at 25° C. (35° C. or less) but could be removed almost completely (about 90%) by the above cleaning.

TABLE 3

| | composition of coating solution (wt % based on the total weight) | | | |
|---|---|---|---|---|
| | surface coating polyester | surfactant | | solvent |
| coating solution 1 | 10 wt % of surface coating polyester A | 2 wt % of polyethylene glycol (molecular weight of 200) | 0.5 wt % of polyoxyethylene sorbitan oleate | water |
| coating solution 2 | 15 wt % of surface coating polyester A | 2 wt % of polyethylene glycol (molecular weight of 300) | 1 wt % of polyoxyethylene sorbitan oleate | water |
| coating | 15 wt % of surface | 2 wt % of polyethylene glycol | — | water |

TABLE 3-continued composition of coating solution (wt % based on the total weight)

| | surface coating polyester | surfactant | | solvent |
|---|---|---|---|---|
| coating solution 3 | coating polyester A 10 wt % of surface | (molecular weight of 300) — | 1 wt % of polyoxyethylene sorbitan oleate | water |
| coating solution 4 | coating polyester A 15 wt % of surface | — | — | water |
| coating solution 5 | coating polyester A 10 wt % of surface | 2 wt % of polyethylene glycol (molecular weight of 200) | 0.5 wt % of polyoxyethylene sorbitan oleate | water/ethanol = 4/1 |
| coating solution 6 | coating polyester A 10 wt % of surface | 2 wt % of polyethylene glycol (molecular weight of 200) | 0.5 wt % of polyoxyethylene sorbitan oleate | water |
| coating solution 7 | coating polyester B 10 wt % of surface | 2 wt % of polyethylene glycol (molecular weight of 200) | 0.5 wt % of polyoxyethylene sorbitan oleate | water |
| coating solution 8 | coating polyester C | | | |

TABLE 4

| | polyester of bottle | surface coating solution | exposed dose of ultraviolet radiation for one time of exposure (mJ/cm²) | haze after cleaning (%) (after 20 times of repetitions) | haze after coating (%) (after 20 times of repetitions) |
|---|---|---|---|---|---|
| Ex. 17 | R. Ex. 1 | coating solution 1 | 20,000 | 3.7 | 0.9 |
| Ex. 18 | R. Ex. 1 | coating solution 2 | 20,000 | 4.0 | 1.0 |
| Ex. 19 | R. Ex. 1 | coating solution 3 | 20,000 | 3.9 | 1.1 |
| Ex. 20 | R. Ex. 1 | coating solution 4 | 20,000 | 3.9 | 1.6 |
| Ex. 21 | R. Ex. 1 | coating solution 5 | 20,000 | 3.6 | 2.0 |
| Ex. 22 | R. Ex. 1 | coating solution 6 | 20,000 | 4.4 | 1.6 |
| Ex. 23 | R. Ex. 1 | coating solution 7 | 20,000 | 4.5 | 1.4 |
| Ex. 24 | R. Ex. 1 | coating solution 8 | 20,000 | 3.8 | 1.0 |
| Ex. 25 | R. Ex. 2 | coating solution 1 | 20,000 | 3.0 | 0.5 |
| Ex. 26 | R. Ex. 3 | coating solution 1 | 20,000 | 2.8 | 0.8 |
| Ex. 27 | R. Ex. 4 | coating solution 1 | 20,000 | 2.5 | 0.9 |
| Ex. 28 | R. Ex. 5 | coating solution 1 | 20,000 | 2.0 | 0.6 |
| C. Ex. 1 | R. Ex. 1 | none | 20,000 | 15.0 | — |

Ex.: Example
C. Ex.: Comparative Example
R. Ex.: Reference Example

Comparative Example 1

A preform was injection molded from a polymer, heated and formed into a bottle by orientation blow molding. The preform was molded by the M100DM molding machine of Meiki Co., Ltd. (cylinder temperature of 290° C., screw revolution of 160 rpm, molding cycle of 30 sec). The preform had an average barrel thickness of 4.2 mm and a weight of about 55 g. The bottle was molded by the LB01 of KRUPP CORPOPLAST Co., Ltd. and had an inner capacity of about 1.5 liters, an average barrel thickness of about 300 μm and a haze of 0.7%. A coating layer was not formed.

The operation cycle of exposing the test sample to ultraviolet radiation by the above method and cleaning it by the above method was repeated 20 times. After the above operation cycle was repeated 20 times, the haze of the test sample was measured. The results are shown in Table 4.

At the time of first exposure to ultraviolet radiation, the exposed dose of ultraviolet radiation for one time of exposure was measured. The results are shown in Table 4.

Example 29

An ester exchange reaction among 100 parts by weight of dimethyl terephthalate, 19 parts by weight of dimethyl 5-sodium sulfoisophthalate, 12.5 parts by weight of dimethyl isophthalate and 72 parts by weight of ethylene glycol was carried out in the presence of manganese acetate and sodium acetate while the by-produced methanol was distilled off to the outside of a system, antimony trioxide was added as a polymerization catalyst and the temperature was increased to 240° C., and trimethyl phosphate was then added as a stabilizer when the distillation of methanol was almost completed to terminate the ester exchange reaction.

Thereafter, the reaction product was polycondensed under high temperature and high vacuum to obtain a polymer having an intrinsic viscosity of 0.37 (mixed solvent of 2 parts by weight of tetrachloroethane and 3 parts by weight of phenol, 25° C.), a Tg of 75° C. and a diethylene glycol content of 3.6 wt %. This polymer was formed into strand-like pellets (cylindrical with a height of 3.5 mm, a short diameter of the bottom of 2.5 mm, a long diameter of the bottom of 3.5 mm).

The pellet was used as a sample and evaluated by the following method. The results are shown in Table 5. Examples 30 to 42 and Comparative Examples 3 and 4

Thermoplastic polyesters were obtained under conditions shown in Table 5 and evaluated in the same manner as in Example 29.

TABLE 5

|  | DMT (mol %) | DMI (mol %) | K2 (mol %) | NDC*1 (mol %) | DEG*2 (wt %) | intrinsic viscosity | Tg (° C.) | solubility in water heated at 95° C. (%) | solubility in water heated at 30° C. (%) | reduction in intrinsic viscosity caused by hydrolysis |
|---|---|---|---|---|---|---|---|---|---|---|
| Ex. 29 | 80 | 10 | 10 | 0 | 3.6 | 0.37 | 75 | 25 | 0.3 | 0.005 |
| Ex. 30 | 80 | 10 | 10 | 0 | 6.7 | 0.45 | 65 | 30 | 0.3 | 0.007 |
| Ex. 31 | 81.5 | 10 | 8.5 | 0 | 3.3 | 0.38 | 76 | 12 | 0.1 | 0.003 |
| Ex. 32 | 81 | 10 | 9 | 0 | 3.8 | 0.39 | 74 | 15 | 0.2 | 0.004 |
| Ex. 33 | 80.5 | 10 | 9.5 | 0 | 4.0 | 0.40 | 73 | 20 | 0.2 | 0.004 |
| Ex. 34 | 77 | 10 | 13 | 0 | 8.5 | 0.40 | 60 | 30 | 0.8 | 0.006 |
| Ex. 35 | 89 | 0 | 11 | 0 | 5.5 | 0.35 | 70 | 25 | 0.6 | 0.006 |
| Ex. 36 | 62 | 30 | 8 | 0 | 3.2 | 0.35 | 75 | 10 | 0.1 | 0.003 |
| Ex. 37 | 70 | 10 | 10 | 10 | 6.5 | 0.40 | 73 | 15 | 0.3 | 0.003 |
| Ex. 38 | 80 | 0 | 10 | 10 | 6.0 | 0.35 | 78 | 20 | 0.3 | 0.003 |
| Ex. 39 | 45 | 15 | 10 | 30 | 7.5 | 0.30 | 88 | 18 | 0.2 | 0.004 |
| Ex. 40 | 25 | 10 | 15 | 50 | 7.2 | 0.28 | 95 | 15 | 0.7 | 0.006 |
| Ex. 41 | 0 | 10 | 15 | 75 | 7.3 | 0.22 | 99 | 12 | 0.6 | 0.006 |
| Ex. 42 | 5 | 0 | 13 | 82 | 7.5 | 0.20 | 103 | 11 | 0.3 | 0.003 |
| C. Ex. 3 | 93 | 0 | 7 | 0 | 2.0 | 0.52 | 77 | 8 | <0.1 | 0.003 |
| C. Ex. 4 | 84 | 0 | 16 | 0 | 13 | 0.14 | 52 | 35 | 2 | 0.015 |

Ex.: Example
C. Ex.: Comparative Example
*1 NDC stands for 2,6-naphthalene dimethylcarboxylate
*2 shows the content of diethylene glycol by-produced by polymerization reaction.

The glass transition temperature, solubility and reduction in intrinsic viscosity shown in Table 5 were measured as follows.

Glass Transition Temperature (Tg):

10 mg of a thermoplastic polyester was used as a sample and its glass transition temperature was measured by DSC at a temperature elevation rate of 5° C./min. solubility:

An excessive amount of a thermoplastic polyester pellet (cylindrical with a height of 3.5 mm, a short diameter of the bottom of 2.5 mm and a long diameter of the bottom of 3.5 mm) was dissolved in water to prepare a solution of the thermoplastic polyester. The obtained solution was let pass through a 100 μm-mesh sieve to remove its solid matter. The amount of the thermoplastic polyester contained in the solution after the solid matter was removed was obtained by subtracting (the amount of the thermoplastic polyester removed as solid matter) from (the amount of the thermoplastic polyester used) to calculate the maximum value of concentration (%) of the thermoplastic polyester in the solution. The solubilities in water heated at 95° C. and water heated at 30° C. of the thermoplastic polyester were measured. reduction in intrinsic viscosity caused by hydrolysis:

This was calculated by subtracting (the intrinsic viscosity of a thermoplastic polyester dissolved in water heated at 95° C. to a concentration of 10% and maintained at 95° C. for 1 hour) from (the initial intrinsic viscosity of the thermoplastic polyester dissolved in water heated at 95° C. to a concentration of 10%).

As for the intrinsic viscosity of the thermoplastic polyester, the intrinsic viscosity of a sample which was dried up by removing water with a vacuum drier was measured.

Example 43

The polymer produced in Example 29 was dissolved in water heated at 95° C. to a concentration of 10 wt % to prepare a solution which was then let pass through 150 μm-mesh, 77 μm-mesh and 45 μm-mesh sieves sequentially to produce a liquid composition. The evaluation results of the liquid composition are shown in Table 6.

This liquid composition was used to form a coating layer on a 380 ml bottle made from the polyethylene naphthalate resin (brand name; TN8065) of Teijin Limited by spray coating. This coating layer did not dissolve in water heated at 30° C. and did not peel off but was removed by 15 minutes of cleaning with hot water heated at 75° C.

Examples 44 and 45

Thermoplastic polyesters having compositions shown in Table 6 were obtained in the same manner as in Example 43 to produce liquid compositions. The evaluation results of the liquid compositions are shown in Table 6.

Example 46

A thermoplastic polyester having composition shown in Table 6 was obtained in the same manner as in Example 43 to produce a liquid composition. The evaluation results of this liquid composition are shown in Table 6.

This liquid composition was used to form a coating layer on a 380 ml bottle made from the polyethylene naphthalate resin (brand name; TN8065) of Teijin Limited by spray coating. This coating layer did not dissolve in water heated at 30° C. and did not peel off but was removed by 15 minutes of cleaning with hot water heated at 75° C.

TABLE 6

|  | thermoplastic polyester | | | | | | liquid composition | | | | |
|  | | | | | | | | solution | | electric | |
|  | DMT (mol %) | DMI (mol %) | K2 (mol %) | NDC*1 (mol %) | intrinsic viscosity | Tg (° C.) | haze (%) | viscosity (Pa · s) | pH | conductivity (μS/cm) | concentration (%) |
|---|---|---|---|---|---|---|---|---|---|---|---|
| Ex. 43 | 80 | 10 | 10 | 0 | 0.37 | 75 | 8 | 0.01 | 5.6 | 840 | 10 |
| Ex. 44 | 80 | 10 | 10 | 0 | 0.35 | 65 | 18 | 0.02 | 6.1 | 2100 | 12 |

TABLE 6-continued

| | thermoplastic polyester | | | | | | liquid composition | | | |
| | | | | | | | solution | | electric | |
| | DMT (mol %) | DMI (mol %) | K2 (mol %) | NDC*1 (mol %) | intrinsic viscosity | Tg (° C.) | haze (%) | viscosity (Pa · s) | pH | conductivity (μS/cm) | concentration (%) |
|---|---|---|---|---|---|---|---|---|---|---|---|
| Ex. 45 | 88 | 0 | 12 | 0 | 0.45 | 60 | 12 | 0.01 | 5.6 | 900 | 20 |
| Ex. 46 | 0 | 10 | 13 | 77 | 0.35 | 85 | 20 | 0.03 | 5.6 | 950 | 10 |

Ex.: Example
*1 NDC stands for 2,6-naphthalene dimethylcarboxylate.

Measurement items which are not described before in Table 6 were carried out as follows.

Preparation of Liquid Composition:

A certain amount of a thermoplastic polyester was dissolved in hot water heated at 95° C. . This solution was let pass through 150 μm-mesh, 77 μm-mesh and 45 μm-mesh sieves sequentially to prepare a liquid composition. The concentration of the thermoplastic polyester in this liquid composition was calculated from the content of the residual solid matter by evaporating and drying up the solution.

Tinubin 234 (of Ciba Speciality Chem. Co., Ltd.) was dissolved in acetone or chloroform and mixed with the above polyester-containing solution under agitation, and the resulting solution was gradually heated at 95° C. to remove acetone or chloroform to prepare a liquid composition.

Haze:

The liquid composition was placed in a sampler and its haze was measured by the Model 1001DP color and color difference meter of Nippon Denshoku Kogyosha Co., Ltd.

pH:

The liquid polyester was placed in a sampler and its pH was measured by the F-14 pH meter of HORIBA Co., Ltd. at 25° C.

Solution Viscosity:

The liquid composition was placed in a sampler and its solution viscosity was measured by the Vismetron VS-A1 unicylindrical rotary viscometer of Shibaura System Co., Ltd. at 25° C.

Electric Conductivity:

The liquid composition was placed in a sampler and its electric conductivity was measured by the CM-21P electric conductivity meter of Toa Denpa Kogyo Co., Ltd. at 25° C.

Example 47

Tinubin 234 (of Ciba Speciality Chem. Co., Ltd.) was dissolved in acetone to a concentration of 0.5 wt % to prepare a solution which was then mixed with the equivalent amount of the liquid composition of Example 43 under agitation and gradually heated at 95° C. to remove acetone to prepare a liquid composition.

This liquid composition was used to form a coating layer on a 380 ml bottle made from the polyethylene naphthalate resin (brand name; TN8065) of Teijin Limited by spray coating. This coating layer did not dissolve in water heated at 30° C. and did not peel off but was removed by 15 minutes of cleaning with hot water heated at 75° C.

The liquid composition was sprayed onto a chip of the polyethylene naphthalate resin (brand name; TN8065) of Teijin Limited to form an ultraviolet light absorbent-containing layer on the surface. A 380 ml bottle containing the ultraviolet light absorbent uniformly was formed from this chip.

Example 48

Tinubin 234 (of Ciba Speciality Chem. Co., Ltd.) was dissolved in chloroform to a concentration of 5 wt % to prepare a solution which was then mixed with the equivalent amount of the liquid composition of Example 43 under agitation and gradually heated at 95° C. to remove chloroform to prepare a liquid composition.

The polyethylene naphthalate resin (brand name; TN8065) of Teijin Limited was supplied from the top feed of a double-screw extruder having 2 open vents and 2 vacuum vents and molten.

Subsequently, the above liquid composition was added to a molten portion of the resin by a quantitative injector. The open vents were disposed before and after the quantitative injector and water as a solvent was removed from these vents. The residual solvent and polyester decomposed gas were removed from the two vacuum vents and the resin was discharged to a strand-like form to be formed into chip.

A 380 ml bottle containing an ultraviolet light absorbent uniformly was formed from this chip.

What is claimed is:

1. A coated polyester hollow molded product comprising:
   (A) a polyester hollow molded product, and
   (B) a polyester coating layer formed on the exterior surface of the hollow molded product, wherein said polyester coating layer (B) has a weight reduction of 3 wt % or less when it is treated with water at 25° C. for 2 hours and is removed when it is treated with an alkali aqueous solution at 75° C. and having a pH of 11.6 for 9 minutes.

2. The coated polyester hollow molded product of claim 1 which has a haze value of 5% or less at a thickness of 300 μm.

3. The coated polyester hollow molded product of claim 1, wherein the polyester coating layer (B) has a thickness of 0.1 to 10 μm.

4. The coated polyester hollow molded product of claim 1, wherein the polyester coating layer (B) is made from a polyester which comprises 92.99 to 60 mol % of at least one dicarboxylic acid unit selected from the group consisting of naphthalene dicarboxylic acid unit and terephthalic acid unit, 0.01 to 20 mol % of an isophthalic acid unit and 7 to 20 mol % of an isophthalic acid unit having a sulfonic acid metal salt group based on the total of all the dicarboxylic acid units as dicarboxylic acid components and 65 to 95mol % of an ethylene glycol unit and 35 to 5 mol % of a diethylene glycol unit based on the total of all the diol units as diol units.

5. The coated polyester hollow molded product of claim 4, wherein the polyester of the polyester coating layer (B) is a polyester which comprises 8 to 15 mol % of an isophthalic acid unit having a sulfonic acid metal salt group based on the total of all the dicarboxylic acid units and 75 to 95 mol % of an ethylene glycol unit based on the total of all the diol units.

6. The coated polyester hollow molded product of claim 5, wherein the polyester of the polyester coating layer (B) is a polyester having a glass transition temperature of 55 to 90° C.

7. A solution for coating the surface of a polyester hollow molded product of claim 4, which contains 1 to 40 wt % of the polyester, 0.1 to 10 wt % of a surfactant and a liquid medium.

8. The solution of claim 7, wherein the liquid medium consists essentially of water.

9. The solution of claim 7 which has a haze value at 25° C. of 30% or less, a pH of more than 5 and less than 7, a viscosity of 0.5 Pa·s or less and an electric conductivity of 100 to 4,000 $\mu$S/cm.

10. The solution of claim 7 which further contains at least one agent selected from the group consisting of an ultraviolet light absorbent and a colorant.

11. The coated polyester hollow molded product of claim 1, wherein the polyester of the polyester coating layer (B) has an intrinsic viscosity of 0.2 to 0.5.

12. The coated polyester hollow molded product of claim 1, wherein the polyester of the polyester coating layer (B) contains an alkali metal compound in an amount of 10 to 400 mmols based on 100 mols of the total of all the dicarboxylic acid components.

13. The coated polyester hollow molded product of claim 1, wherein the polyester of the polyester coating layer (B) has the following properties (1), (2) and (3);
   (1) a solubility in water at 95° C. of 10 wt % or more,
   (2) a solubility in water at 30° C. of 1 wt % or less, and
   (3) a reduction in intrinsic viscosity after 1 hour of a treatment with water at 95° C. of 0.01 at maximum.

14. The coated polyester hollow molded product of claim 1, wherein the polyester coating layer (B) further contains a surfactant in an amount of 5 to 50 parts by weight based on 100 parts by weight of the polyester.

15. The coated polyester hollow molded product of claim 1, wherein the polyester of the polyester hollow molded product (A) is polyethylene terephthalate or polyethylene-2,6-naphthalene dicarboxylate.

16. A method of regenerating a coated polyester hollow molded product, comprising the steps of:
   preparing the salvaged coated polyester hollow molded product of claim 1,
   removing a polyester coating layer from the hollow molded product, and
   forming a new polyester coating layer on the surface of the hollow molded product from which the polyester coating layer has been removed.

17. The method of claim 16, wherein the removal of the polyester coating layer is carried out using water or an alkali aqueous solution at a temperature of 60 to 100° C.

18. The method of claim 7, wherein a solution for coating the surface of a polyester hollow molded product is applied to the surface of the hollow molded product and dried to form a new polyester coating layer, thereby forming a coated polyester hollow molded product comprising (A) a polyester hollow molded product, and (B) a polyester coating layer formed on the exterior surface of the hollow molded product, wherein said solution for coating the surface of a polyester hollow molded product contains 1 to 40 wt % of a polyester which comprises 92.99 to 60 mol % of at least one dicarboxylic acid unit selected from the group consisting of naphthalene dicarboxylic acid unit and terephthalic acid unit, 0.01 to 20 mol % of an isophthalic acid unit and 7 to 20 mol % of an isophthalic acid unit having a sulfonic acid metal salt group based on the total of all the dicarboxylic acid units as dicarboxylic acid components and 65 to 95 mol % of an ethylene glycol unit and 35 to 5 mol % of a diethylene glycol unit based on the total of all the diol units as diol units, 0.1 to 10 wt % of a surfactant and a liquid medium.

\* \* \* \* \*